United States Patent [19]
Yokonuma

[11] Patent Number: 5,243,376
[45] Date of Patent: Sep. 7, 1993

[54] PHOTOMETRY APPARATUS IN A CAMERA
[75] Inventor: Norikazu Yokonuma, Tokyo, Japan
[73] Assignee: Nikon Corporation, Tokyo, Japan
[21] Appl. No.: 750,953
[22] Filed: Aug. 28, 1991
[30] Foreign Application Priority Data
  Sep. 4, 1990 [JP] Japan .................................. 2-233870
[51] Int. Cl.$^5$ .............................................. G03B 7/00
[52] U.S. Cl. .................................. 354/413; 354/418;
                                        354/145.1; 354/414
[58] Field of Search ................... 354/413, 414, 127.1,
                                354/145.1, 418, 127.11, 127.12

[56] References Cited
U.S. PATENT DOCUMENTS
4,862,206  8/1989  Ootsuka et al. ................ 354/414
5,006,879  4/1991  Takagi et al. ................... 354/413

FOREIGN PATENT DOCUMENTS
60-15626  1/1985  Japan .
61-208039 9/1986  Japan .

Primary Examiner—Russell E. Adams
Attorney, Agent, or Firm—Shapiro and Shapiro

[57] ABSTRACT

A photometry apparatus in a camera includes a light receiving portion having a plurality of light receiving elements for flash photographing, and a plurality of amplifiers for amplifying the outputs of the light receiving elements, respectively, and is provided with a push button switch for selecting one or more of the light receiving elements, a photographing data setting dial rotated while the push button switch is pushed, and a display device for displaying the set state of the dial, and is further provided with a central processing unit for converting a digital signal into an analog value through a digital-analog converter and variably controlling the output voltage thereof so that the outputs of the light receiving elements may be the same in order to change the amplification factor or factors of the amplifier or amplifiers corresponding to the selected light receiving element or elements so as to make up for the outputs of the light receiving elements which have not been selected.

5 Claims, 6 Drawing Sheets

PHOTOMETRY APPARATUS IN A CAMERA

BACKGROUND OF THE INVENTION

1. Field of the Invention

This invention relates to a TTL photometry apparatus in a camera, and particularly to a photometry apparatus having a multidivision light receiving portion for flash photographing.

2. Related Background Art

As a photometry apparatus of this type for flash photographing, there is known an auto stroboscopic apparatus as disclosed, for example, in Japanese Laid-Open Patent Application No. 60-15626 wherein two measuring portions are used to measure the reflected light from an object by flash emission and the outputs from the measuring portions are weighted and summed to thereby obtain a light emission stopping signal.

In the prior-art photometry apparatus described above, there has been no method of adopting the photographer's will during photographing. For example, when there is an object at one end of the picture plane, the other portions are also metered, or when there is a high-luminance object such as the sun or a highreflection object such as a mirror in the picture plane, photographing is affected thereby, and it has been impossible to obtain a proper quantity of hight for an object to be photographed.

SUMMARY OF THE INVENTION

It is an object of the present invention to solve the above-noted problem and to provide a photometry apparatus which is designed to select a photometry area for flash photographing to thereby obtain a proper quantity of light.

It is another object of the present invention to provide a photometry apparatus which, when such selection is to be done, is excellent in the conformability with the selecting operation for the case of ordinary light photographing and is easy to perform the selecting operation.

To solve the above-noted problem, the photometry apparatus according to the present invention comprises first and second solving means.

The first solving means is a photometry apparatus including light receiving means having a plurality of light receiving elements for flash photographing, and a plurality of amplifiers for amplifying the outputs of said light receiving elements, respectively, and is of a construction provided with selection means for selecting one or more of said light receiving elements, and amplification factor changing means for changing the amplification factors of said amplifiers corresponding to said light receiving element or elements selected by said selection means, so as to make up for the outputs of said light receiving elements which have not been selected by said selection means.

The second solving means is a photometry apparatus including first light receiving means having a plurality of light receiving elements for flash photographing, and second light receiving means having a plurality of light receiving elements for ordinary light photographing, and is of a construction provided with selection means for selecting one or more of said light receiving elements of said first or second light receiving means independently for each of said light receiving means, and changeover means for detecting the usable state of a flash device and changing over so that when the flash device is in its usable state, said selection means may select said first light receiving means, and when the flash device is not in its usable state, said selection means may select said second light receiving means.

According to said first solving means, only the light receiving elements to be used can be selected by the selection means and the outputs of the light receiving elements which have not been selected are made up for by the amplification factor changing means and therefore, a proper quantity of light can be obtained.

According to said second solving means, when the light receiving elements for flash photographing are to be selected by the selection means, when the flash device is in its usable state, the selection means so far used for ordinary light photographing is automatically changed over to one for flash photographing by the changeover means and therefore, the selection means for flash photographing and the selection means for ordinary light photographing can be provided by one selection means.

DESCRIPTION OF THE PREFERRED EMBODIMENTS

The present invention will hereinafter be described in detail with respect to some embodiments thereof with reference to the drawings.

Figure 1:
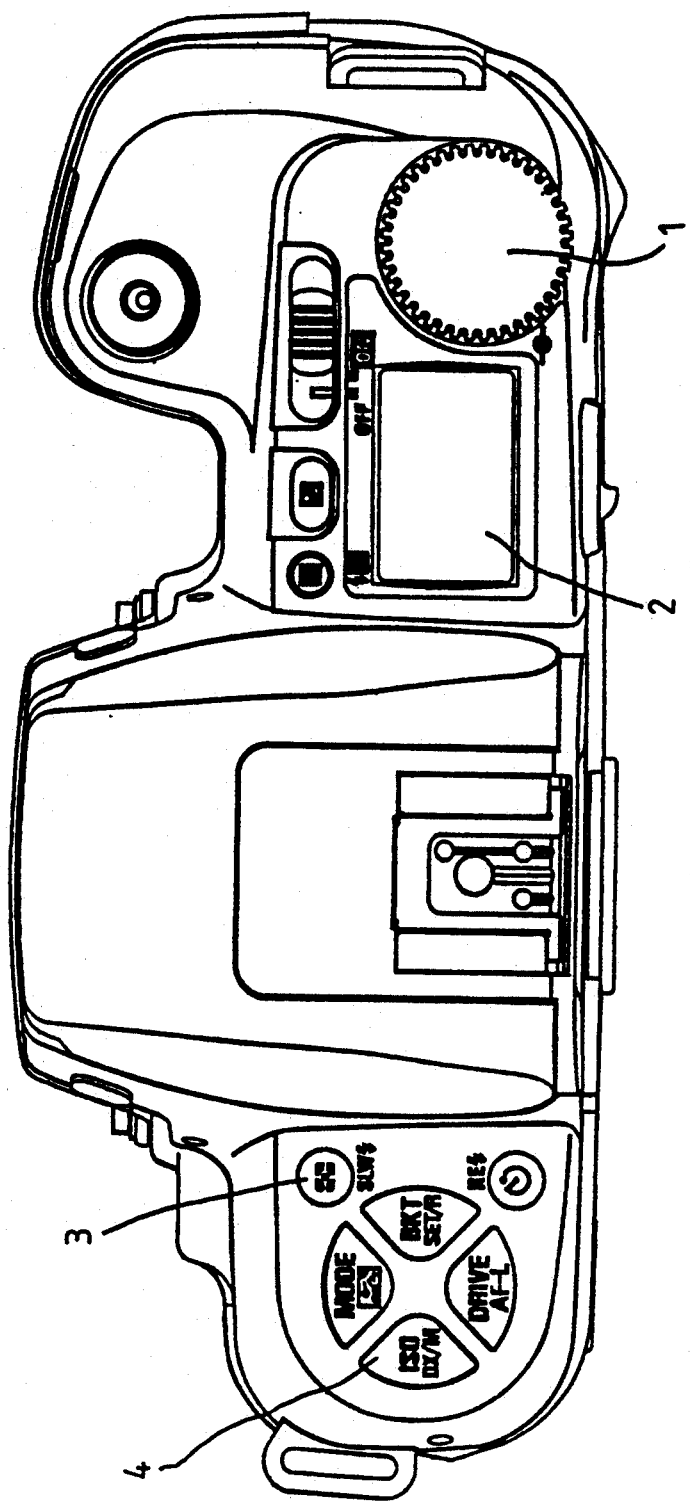
FIGS. 1 to 6 show an embodiment of an exposure apparatus according to the present invention, FIG. 1 being a pictorial perspective view of an entire camera, FIGS. 2A, 2B, 2C, 3A, 3B, 3C, 3D, 3E and 3F showing examples of the display by a display device, FIG. 4 showing the internal structure of the camera, FIG. 5 showing a light receiving portion for flash photographing, and FIG. 6 being a circuit diagram showing a control unit.

FIGS. 1, 2A-2C and 3A-3F show an embodiment of an exposure apparatus according to the present invention. FIG. 1 is a pictorial perspective view of an entire camera, FIGS. 2A-2C and FIGS. 3A-3F show examples of the display by a display device.

In FIG. 1, a photographing data setting dial 1 is for setting data such as the exposure control mode of the camera and film speed. The kinds of the data set by this dial 1 are determined by push button switches 3 and 4 provided discretely. For example, by rotating the dial 1 while pushing the switch 3, the photometry mode can be set to a new photometry mode. Likewise, by rotating the dial 1 while pushing the switch 4, film speed is varied and the setting of the film speed can be accomplished.

With a flash device not mounted on the camera, the photometry mode for ordinary light photographing can be set as the photometry mode, and by rotating the photographing data setting dial 1 while pushing the switch 3, center priority photometry, multiphotometry for obtaining proper exposure by a plurality of light receiving elements, etc. are selected.

With a flash device mounted on the camera, by rotating the photographing data setting dial 1 while pushing the switch 3, the mode setting is changed from the setting of the photometry mode for ordinary light photographing to the setting of the photometry mode for flash photographing, and by the rotation of the dial 1, flash multiphotometry, flash spot photometry, flash margin photometry, etc. are selected.

These set states are displayed by a display device 2, as shown in FIGS. 2A-2C and 3A-3C.

Figure 2A:
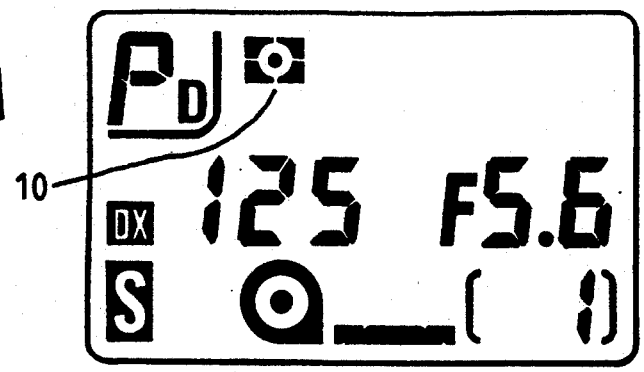
Figure 2B:
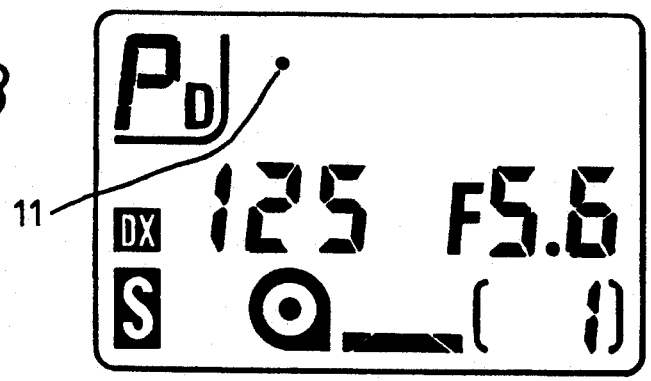

FIGS. 2A and 2B show a state in which the flash device is not mounted on the camera. Display 10 shown in FIG. 2A is display representative of the multiphotometry mode, and appears when the photometry mode is set to the multiphotometry mode by rotating the dial 1 while pushing the switch 3. Display 11 shown in FIG. 2B is display representative of the center priority photometry mode, and appears when the photometry mode is set to the center priority photometry mode by rotating the dial 1 while pushing the switch 3. Thus, when the flash device is not mounted on the camera, by rotating the dial 1 while pushing the switch 3, the display device 2 is changed in such a manner as display 10→display 11→display 10→display 11 . . . as shown in FIGS. 2A and 2B, and the photometry mode for ordinary light photographing can be selected.

Figure 2C:
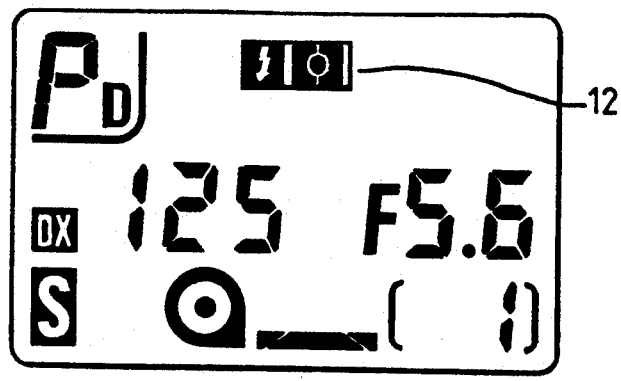

By the flash device being mounted on the camera, the display 10 and display 11 on the display device 2 disappear and in place thereof, the display 12 of the photometry mode for flash photometry as shown in FIG. 2C appears.

FIGS. 3A-3F show the display states in the respective modes of the display 12. With the flash device mounted on the camera, by rotating the dial 1 while pushing the switch 3, the display 12 is changed in such a manner as FIG. 3A→FIG. 3B→FIG. 3C→FIG. 3D→FIG. 3E→FIG. 3F→FIG. 3A→FIG. 3B→. . . , and the photometry mode for flash photographing can be selected.

Figure 3A:
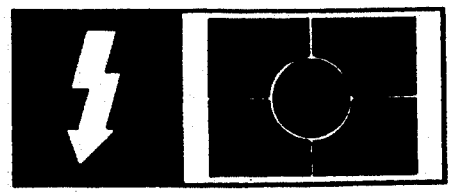

FIG. 3A shows the display of the flash multiphotometry mode, and in this mode, a plurality of light receiving elements for TTL automatic flash control meter the reflected light of flashlight and determine a proper quantity of flashlight from the total output of the light receiving portion.

Figure 3B:
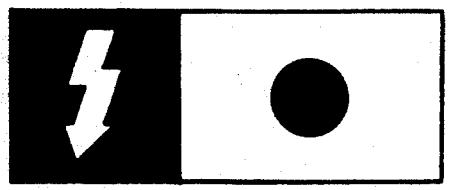

FIG. 3B shows the display of the flash spot photometry mode, and in this mode, only the light receiving element for TTL automatic flash control disposed in the central portion of the photographing picture plane is selected and meters the reflected light of the flashlight, and determines a proper quantity of flashlight from the output of only that light receiving element.

FIGS. 3C, 3D, 3E and 3F show the display of the flash margin photometry mode, and in this mode, one of four light receiving elements for TTL automatic flash control disposed so as to meter the marginal portion of the photographing picture plane is selected and a proper quantity of flashlight is determined from the output of only the selected light receiving element.

Figure 3C:
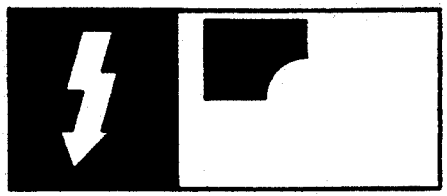
Figure 3D:
Figure 3E:
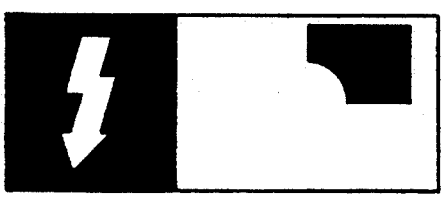
Figure 3F:

The selected light receiving element is disposed so as to meter the left upper portion of the picture plane in the display state of FIG. 3C, to meter the left lower portion of the picture plane in the display state of FIG. 3D, to meter the right upper portion of the picture plane in the display state of FIG. 3E, and to meter the right lower portion of the picture plane in the display state of FIG. 3F.

Figure 4:
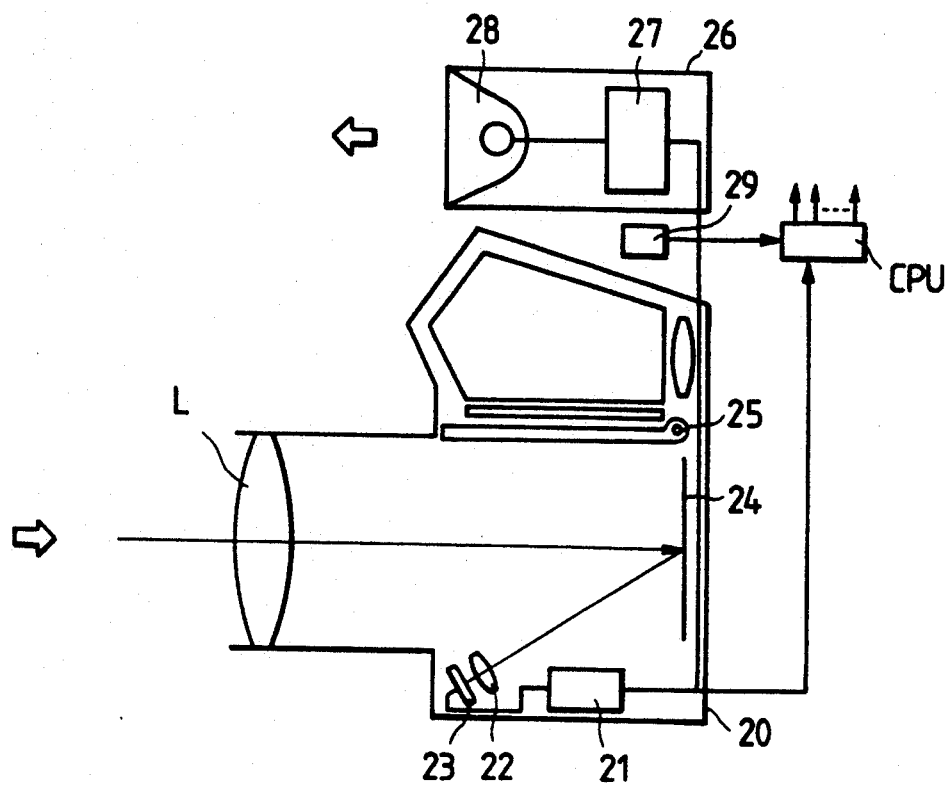
Figure 5:
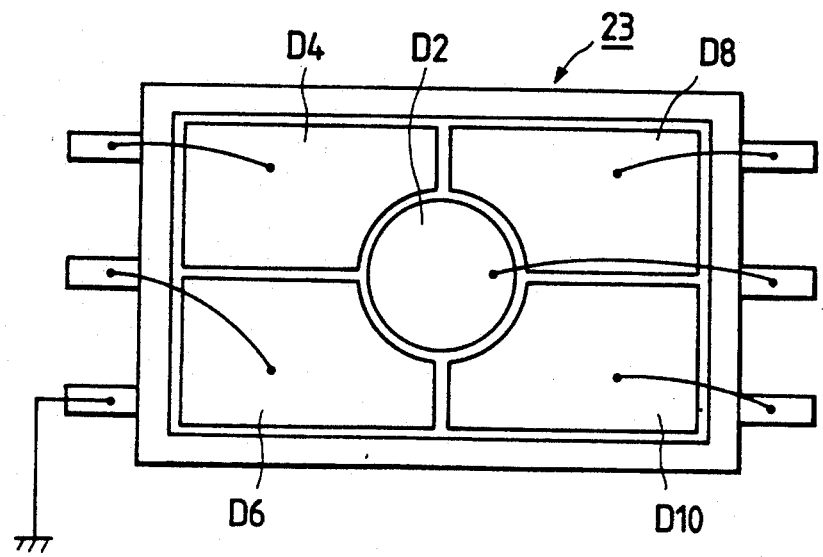
Figure 6:
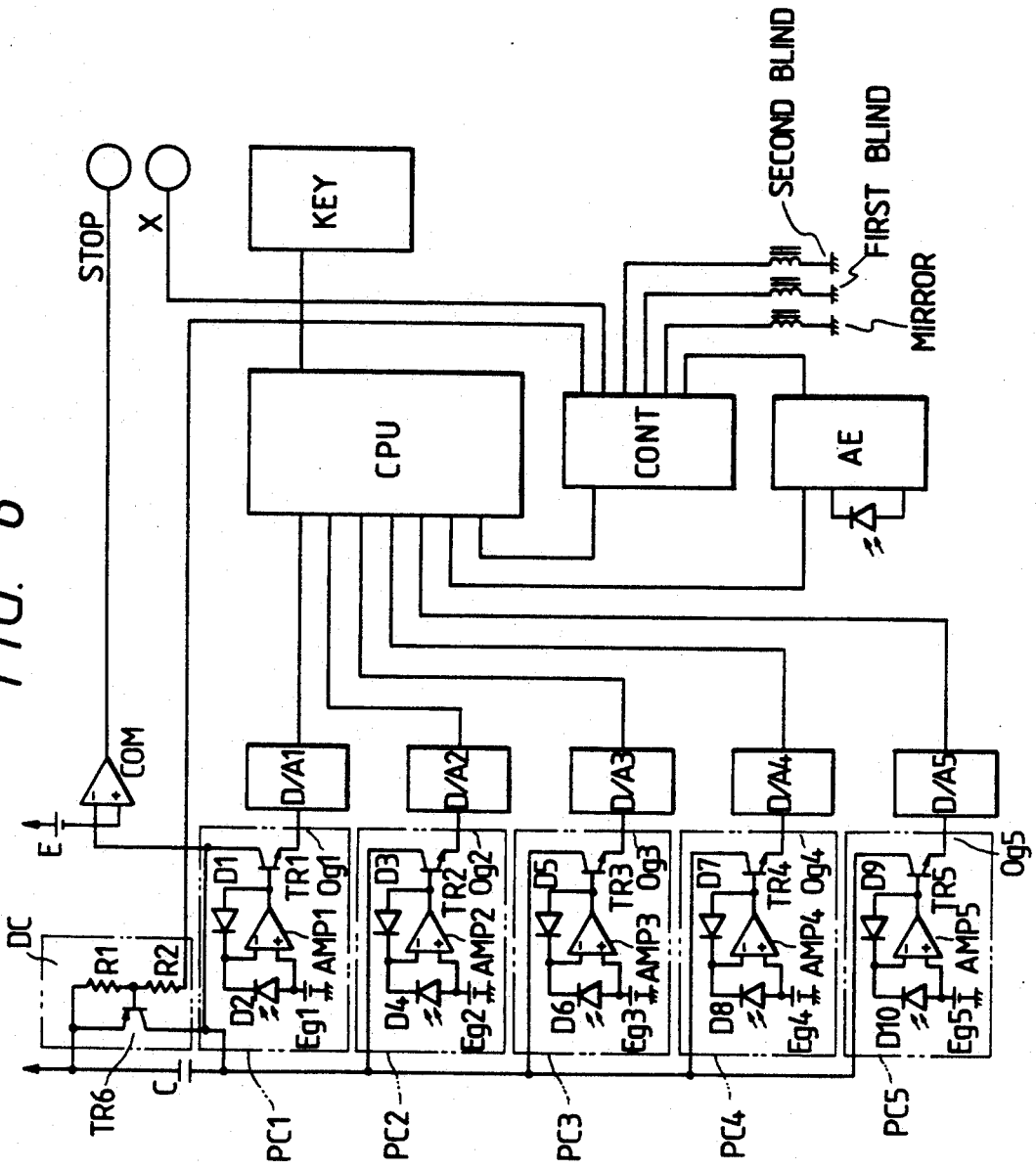

FIGS. 4 to 6 show an embodiment of a photometry apparatus according to the present invention. FIG. 4 shows the internal structure of a camera, FIG. 5 shows a light receiving portion for flash photographing, and FIG. 6 is a circuit diagram showing a control unit.

In FIG. 4, the camera 20 is such that in the ordinary state before release, a mirror 25 is in its lowered position and a shutter, not shown, is closed. In this state, the camera 20 meters the quantity of ordinary light and determines from the output thereof a shutter speed and an aperture value suited for flash photographing.

When the camera 20 is released, a diaphragm device, not shown, is stopped down, and the mirror 25 is moved up and retracted from the optical path, and the shutter is fully opened and exposes film 24. When the shutter is fully opened, a flash control circuit 21 delivers a light emission starting signal to the light emission control circuit 27 of a flash device 26. When the light emission control circuit 27 receives the light emission starting signal, a light emitting portion 28 starts to emit flashlight.

This flashlight is applied to an object and the reflected light thereof arrives at the film 24 through the photo-taking lens L of the camera 20, and the film 24 is exposed. The light which has arrived at the film 24 is imaged on a light receiving portion 23 through a lens 22. The flash control circuit 21 measures a proper exposure amount from the output of the light receiving portion 23 and when the proper exposure amount is reached, the flash control circuit 21 sends a light emission stopping signal to the light emission control circuit 27 to thereby stop the light emission of a light emitting portion 28.

The light receiving portion 23 is divided into five as shown in FIG. 5, and light receiving elements (diodes for detecting the quantity of light) D2, D4, D6, D8 and D10 meter the central portion, the left upper portion, the left lower portion, the right upper portion and the right lower portion, respectively, of the photographing picture plane.

A flash device detecting circuit 29 is for detecting whether the flash device 26 has been mounted on the camera 20 and has become usable, and the output thereof is connected to a central processing unit CPU which will be described later.

The control unit will now be described with reference to FIG. 6.

A switch information reading device KEY is a device for reading the states of a release switch, the photographing data setting dial and the push button switches 3, 4 shown in FIG. 1, and the output thereof is transmitted to the central processing unit CPU.

The central processing unit CPU is a processing unit which receives various kinds of information as inputs and calculates and outputs the result of the calculation to the surrounding devices thereof.

A camera control circuit CONT is a circuit for controlling the driving or the like of the shutter by the command of the central processing unit CPU.

An ordinary light photometry circuit AE is a circuit which meters ordinary light and digitally converts the result of the metering and transmits it to the central processing unit CPU and also transmits the shutter opening time to the camera control circuit CONT from the result of the photometry.

Digital-analog converters D/A1-D/A5 are for converting digital signals sent thereto from the central processing unit CPU into analog values and outputting the analog signals as output voltages Og1-Og5.

Photometry circuits PC1-PC5 are comprised of operational amplifiers AMP1-AMP5, reference DC voltages Eg1-Eg5, diodes D1-D10, transistors TR1-TR5, etc., and the gains thereof are variably controlled by the outputting of the output voltages Og1-Og5 of the digital-analog converters D/A1-D/A5.

The photometry circuits PC1-PC5 are known from Japanese Laid-Open Patent Application No. 61-208039 and therefore, the operation thereof need not be described herein. As is clear from the description of Japanese Laid-Open Patent Application No. 61-208039, the gains of the photometry circuits PC1-PC5 are determined by the differences between the emitter potentials of the output transistors TR1-TR5 and the potentials of the plus terminals of the operational amplifiers AMP-1-AMP5 For example, with regard to the photometry circuit PC1 in the central portion of the picture plane, the gain thereof is determined by the potential difference between the output voltage Og1 from the digital-analog converter D/A1 and the reference DC voltage Eg1.

The setting of the gains of the photometry circuits PC1-PC5 will now be described.

When the object is a uniform surface having a standard reflectance, the contribution rates of the outputs of the photometry circuits PC1-PC5 to the result of photometry must be the same. Accordingly, the central processing unit CPU variably controls the output voltages Og1-Og5 of the digital-analog converters D/A1-D/A5 so that the outputs of the photometry circuits PC1-PC5 may be the same.

When there is a high luminance matter by ordinary light in a portion of the object (for example, when the sun partially comes into the object) or when there is a high reflection matter in a portion of the object (for example, when there is a mirror or the like), if the values of the respective photometry circuits PC1-PC5 are intactly averagely metered, the exposure to the main object will be deficient due to the high value of the high luminance matter or the high reflection matter. Accordingly, to eliminate such deficiency of exposure, in the present invention, the design is made such that the high value of the high luminance matter or the high reflection matter is deleted.

In this embodiment, the light receiving portion 23 is divided into five areas, in which there are provided five measuring circuits PC1-PC5, and when there is a high luminance matter or a high reflection matter in one of the divided areas (diodes D2, D4, D6, D8 and D10 for detecting the quantity of light), for example, when there is the sun in the left upper portion of the picture plane, the design can be made so as to eliminate the output from the photometry circuit PC2 connected to the digital-analog converter D/A2.

In order that the photometry circuit PC2 in the left upper portion of the picture plane may not put out its output, the voltage of the output Og2 of the digital-analog converter D/A2 can be made equal to the source voltage. However, in that case, the sum of the photometry outputs to the aforementioned uniform reflecting surface will become 4/5 and overexposure will take place. So, the design is made such that the outputs of the other photometry circuits PC1 and PC3-PC5 are increased to 5/4 (=1.25) times.

That is, the central processing unit CPU controls so that a signal for making the output voltage Og2 equal to the value of the source voltage may be sent to the digital-analog converter D/A2 and a signal for increasing the gain to 1.25 times as previously described may be sent to the other digital-analog converters D/A1, D/A3, D/A4 and D/A5, whereby a proper value of exposure to the main object may be obtained.

A discharging circuit DC is a circuit which comprises a transistor TR6 and resistors R1 and R2 and discharges charges accumulated in an integration capacitor C integrating the sum of the five photometry circuits PC1-PC5 by the camera control circuit CONT.

A comparator COM differentially compares a voltaged charged in the integration capacitor with a reference voltage E and outputs a light emission stopping signal to a terminal STOP when the voltage charged in the integration capacitor C exceeds the reference voltage E.

The control operation of the embodiment of the exposure apparatus according to the present invention will now be described.

The central processing unit CPU judges by the signal from the flash device detecting circuit 29 shown in FIG. 4 whether the flash device 26 has been connected to the camera 20 and is in its usable state. When in the meantime, as described in connection with FIG. 1, the photographing data setting dial 1 is rotated while the switch 3 is pushed, the switch information reading device KEY outputs the read information to the central processing unit CPU.

When the central processing unit CPU judges by the output from the flash device detecting circuit 29 that the flash device 26 is not connected to the camera 20, it indicates a photometry mode such as multiphotometry or center priority photometry to the ordinary light photometry circuit AE in conformity with the rotation of the dial 1 and changes the photometry mode for ordinary light photographing.

When the central processing unit CPU judges that the flash device 26 is connected to the camera 20, it changes the photometry mode for flash photographing, as shown in FIGS. 3A-3F.

Assuming that flash multiphotometry has been selected, the central processing unit CPU controls the output voltages Og1-Og5 through the digital-analog converters D/A1-D/A5 so that the respective photometry circuits PC1-PC5 may provide the proper gains as described previously. At this time, the photometry circuits PC1-PC5 connected to the digital-analog converters D/A1-D/A5, respectively, meter the central portion, the left upper portion, the left lower portion, the right upper portion and the right lower portion, respectively, of the picture plane of the light receiving portion 23 shown in FIG. 5.

Also, assuming that flash spot photometry has been selected, the central processing unit CPU controls the output voltages Og1-Og5 so as to meter the flashlight by only the photometry circuit PC1 in the central portion of the picture plane and stop the outputs of the photometry circuits PC2-PC5 in the other portions. To prevent the other photometry circuits PC2-PC5 from putting out their outputs, the output voltages Og2-Og5 of the digital-analog converters D/A2-D/A5 can be made equal to the source voltage, as described previously. To obtain proper exposure at this time, the output of the photometry circuit PC1 in the central portion of the picture plane can be increased to five times relative to the uniform reflecting surface as described previously.

That is, the central processing unit CPU, in order to obtain a proper value of exposure to the main object, sends to the digital-analog converter D/A1 such a signal that the output voltage Og1 increases the gain of the photometry circuit PC1 to five times, and sends to the other digital-analog converters D/A2–D/A5 such signals that the respective output voltages Og2–Og5 become equal to the source voltage.

When flash margin photometry is selected, control can be effected in the same manner so that only the photometry circuit in the selected light receiving area may provide a gain five times as great as that of the aforementioned uniform reflecting surface, and the other portions may not output.

The ordinary light photometry circuit AE meters ordinary light by the photometry mode indicated from the central processing unit CPU, converts the result of the photometry into a digital value and sends it to the central processing unit CPU. The central processing unit CPU calculates the shutter speed from this result of the photometry. If the flash device 26 is mounted on the camera at this time, the shutter speed will be the synchro tuning shutter time or less. The calculated shutter speed is sent to the camera control circuit CONT.

The photometry circuits PC1–PC5 for flash photographing and the ordinary light photometry circuit AE are set in the manner described above.

When in this state, the release switch of the camera is depressed, that information is transmitted central processing unit CPU, which thus instructs the camera control circuit CONT to release. The camera control circuit CONT, when instructed to release, drives a diaphragm device, not shown, and moves the mirror upwardly and also turns on the transistor TR6, thereby causing the integration capacitor C to discharge.

Subsequently, the forward shutter curtain is opened by a signal from the camera control circuit CONT. When the forward shutter curtain is fully opened and the film 24 is exposed, a light emission starting signal is sent to the light emission control circuit 27 of the flash device 26 through a terminal X and at the same time, the transistor TR6 is turned off, thereby, s the integration of the integration capacitor C.

The flash device 26 starts its flashlight emission by the light emission starting signal and illuminates the object. At this time, the photometry circuits PC1–PC5 for flash photographing selected in the previously described manner meter the quantity of light applied by the flash device 26 and reflected by the object, and the result of the photometry is integrated as an electrical amount by the integration capacitor C.

When the amount of integration by the integration capacitor C reaches an amount (voltage) corresponding to the proper quantity of light prescribed by the reference voltage E, the output of the comparator COM assumes a low level, and a light emission stopping signal of low level is sent to the light emission control circuit 27 of the flash device 26 through the terminal STOP. By this light emission stopping signal, the light emission control circuit 27 stops the flashlight emission of the light emitting portion 28.

Figure 7:
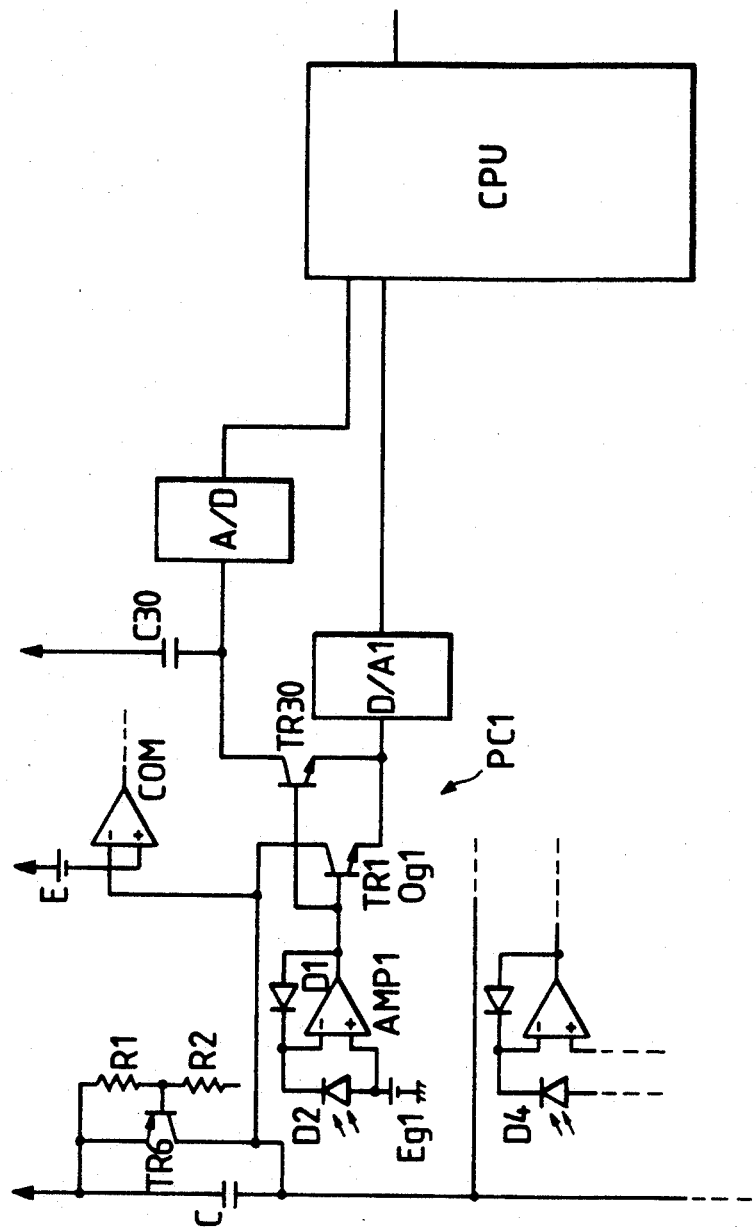
FIG. 7 is a circuit diagram showing portions of a control unit in another embodiment of the photometry apparatus according to the present invention.

FIG. 7 is a circuit diagram showing portions of a control unit in another embodiment of the photometry apparatus according to the present invention.

In this embodiment, portions functionally similar to those in FIG. 6 are given similar reference characters and only the photometry circuit PC1 is shown because the circuit construction is similar.

In the aforedescribed embodiment (FIG. 6), as a method of selecting the contribution rates of the photometry circuits PC1–PC5, the presence or absence of a high luminance matter has been judged from the outputs of the plurality of light receiving elements of the ordinary light photometry circuit AE, whereby the contribution rates have been varied.

In this embodiment, an output transistor TR30 and an integration capacitor C30 are additionally provided, and the output value of the photometry circuit PC1 is digitally converted by an analog-digital converter A/D so that the digital value can be read by the central processing unit CPU. The other photometry circuits PC2–PC5 are of similar construction.

In this state, as described in connection with FIG. 4, the flash device 26 is caused to effect preliminary light emission before the film 24 is exposed, whereby the quantity of light reflected thereby is measured and the reflectance is calculated from the difference between the outputs of the photometry circuits PC1–PC5, and the contribution rate is varied by that reflectance.

The present invention is not restricted to the above-described embodiments, but can be variously modified within the scope of the invention.

For example, the selection of the light receiving areas is not limited to that shown in FIGS. 3A–3F, but two or more of the areas of FIGS. 3B–3F may be combined.

In the case of a flash device contained in the camera, whether the flash device is popped up can be detected or the operation of the charging circuit can be detected, thereby detecting the usable state of the flash device.

I claim:

1. A photometry apparatus including first light receiving means having a plurality of light receiving elements for flash photographing, and second light receiving means having a plurality of light receiving elements for ordinary light photographing, characterized by the provision of:

selection means for selecting one or more of the light receiving elements of said first light receiving means, in a first operational state, and selecting one or more of the light receiving elements of said second light receiving means, in a second operational state; and changeover means for detecting whether or not a flash device is in a usable state and changing over between said second and first operational states, and vice versa, so that when the flash device is in its usable state, said selection means selects light receiving elements of said first light receiving means, and when the flash device is not in its usable state, said selection means selects light receiving elements of said second light receiving means.

2. A photometry apparatus according to claim 1, wherein said selection means comprises a push button switch, a photographing data setting dial rotated while said switch is pushed, and a display device for displaying the set state of said dial.

3. A photometry apparatus according to claim 1, wherein said changeover means is a central processing unit which judges by a signal from a flash device detecting circuit whether said flash device is connected to a camera and is in its usable state, and which is connected to said flash device detecting circuit.

4. A photometry apparatus including a plurality of light receiving elements, and comprising:

selection means for selecting one or more of the light receiving elements in a first operational state and for selecting one or more of the light receiving elements in a second operational state, certain of the light receiving elements being selectable by the selection means in one of the first and second operational states but not in the other operational state; and changeover means for detecting whether or not a flash device is in a usable state and changing over between said second and first operational states, and vice versa, so that when the flash device is in its usable state, the selection means is in the first operational state and when the flash device is not in its usable state, the selection means is in the second operational state.

5. A photometry apparatus according to claim 4 wherein said plurality of light receiving elements include a central light receiving element and perimeter light receiving elements, wherein in the first operational state the selection means can select any one or all of said light receiving elements, and int he second operational state, the selection means can only select the central light receiving element or all of the light receiving elements.

* * * * *